Patented Apr. 17, 1945

2,373,729

UNITED STATES PATENT OFFICE 2,373,729

THICKENING AND CONGEALING AGENT

John J. Willaman, Plymouth Meeting, Pa., assignor to Claude R. Wickard, as Secretary of Agriculture of the United States of America, and his successors in office No Drawing. Application December 5, 1942, Serial No. 467,939

12 Claims. (Cl. 99—132)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

My invention relates to thickening and congealing agents.

One of the objects of my invention is to provide a congealing agent for the preparation of solid salads, aspics, jellies, puddings, and similar food products.

A further object is to provide a thickening agent for liquids, such as sirups, catsup, and the like, where an increased viscosity is desired without an increase in the concentration of the principal ingredients.

Still another object is to provide a thickening and congealing agent for non-food materials.

I have found that the combination comprising pectin, pectase, and a soluble salt of a polyvalent metal, preferably a calcium salt, can be used effectively as a thickening or congealing agent. When these ingredients are dissolved in an aqueous medium, the pectase causes the hydrolysis of the methyl ester groups of the pectin which results in the formation of pectinates, and the polyvalent metal of the soluble salt combines with the pectinates to form a viscous solution or a solid gel, depending on the concentration of the reacting constituents.

A convenient embodiment of my invention is a mixture of the stated ingredients in dry form. If such a mixture is dissolved in an aqueous liquid containing the material to be thickened or congealed, the solution will become viscous or set to a gel. The time required for the thickening or congealing effect depends on the proportions of the ingredients in the mixture, the temperature at which the solution is maintained, and the pH value of the solution. The use of a mixture, however, is only a matter of convenience, and the ingredients may be dissolved separately if circumstances require or favor that procedure.

Since there is some confusion in nomenclature, the following will define certain terms as used herein. By "pectin" is meant the familiar preparation of commerce or of the laboratory, prepared from plant extracts by precipitation with alcohol, acetone, or metallic salts, with no attempt to modify its natural methyl ester content, which varies from about 10 percent to 14 percent. By "pectic acid" is meant a more or less completely demethylated pectin, usually attained by treating pectin with alkali. By "pectinic acid" is meant any one of a series of derivatives of pectin with a methyl ester content intermediate between that of pectin and pectic acid. The term "pectinate" is used generically to indicate either the acid itself or its salts. By "pectase" is meant the enzyme which hydrolyzes the methyl ester groups in pectin.

Enzymes in general are active only within certain ranges of pH value, and the enzyme pectase is not an exception. Below a pH value of about 3.7, it is practically inactive. Above a pH value of 4 its activity increases rapidly, until a pH value of 7 is exceeded, when the action of the enzyme is confused with the demethylating action of the alkaline medium itself. Thus the use of the present invention in food products is essentially limited to the pH range of about 3.7 to 7, since below this range the pectase does not act, and since the great majority of food products have a pH value less than 7.

Enzymes also have rather definite temperature requirements. Pectase increases its rate of activity until a temperature of 45° to 50° C. is reached, and beyond this the activity declines rapidly. Therefore, in the use of this invention as high a temperature is used as is permissible with the product in hand, up to a maximum of about 50° C.

The presence of a polyvalent metallic ion is required for the formation of the desired viscous or solid pectinate. Such metals as calcium, magnesium, iron, and aluminum are examples, calcium and magnesium being preferred in the range of pH indicated. Monovalent ions, such as sodium potassium, and ammonium form pectinates which are soluble and which lack high viscosity. In the case of food products, a soluble calcium salt is usually employed, such as calcium acetate or mono-calcium phosphate. Many plant juices and extracts contain sufficient calcium for the reaction, but since this is uncertain it is usually preferable to add calcium.

During the action of the pectase on pectin in the presence of a polyvalent metal, two changes take place which tend to retard the rate of action of the pectase. These are the development of acidity and the formation of a solid gel. The acidity arises from the freeing of acidic radicals of the pectin by the pectase. This increased acidity tends to lower the pH value of the solution, and hence to lower the rate of action of the pectase. The formation of a solid gel lowers the rate of diffusion of the active ingredients and hence tends to retard the rate of action. The first factor can be compensated for in various ways. In some products a buffering or neutralizing substance, such as sodium bicarbonate or a sodium or potassium phosphate, may be added to the mixture to counteract the change in acidity. In other products the proportions of active ingredients may be adjusted so that a satisfactory thickening action or gel formation will be attained before an adverse acidity is formed. The second factor is often an advantage since in many cases the gel formation is the object to be attained. In such cases further action of the enzyme is not necessary and sometimes may not be desirable.

The pectin used may be the ordinary pectin of commerce, made from either citrus fruits or from apples. A solution of pectin may be used, provided the pectase is not incorporated with it until both are added to the liquid to be congealed. A dry preparation of pectin mixed with the proper amount of calcium salt and of pectase preparation is the most convenient form to merchandise for household use.

The pectase preparation may be derived from any convenient source in any convenient form. It must be free from the enzyme pectinase, however, since the latter would lower the molecular weight of the pectinates formed and decrease their gel-forming capacity. Convenient and suitable sources of pectase are ripe tomatoes and unripe eggplant fruit. There are several known ways of preparing these materials in dry, powdered form. A very satisfactory method is to slice the fruit of unripe eggplant, dry in a current of air at 60° C., or less, grind, and sieve through an 80- or 100-mesh sieve. In the following examples such a preparation is designated by the term "eggplant powder."

A number of examples will illustrate the manner in which this invention may be used:

*Example I.*—A tomato aspic was prepared by dissolving in 100 cc. of canned tomato juice, warmed to 50° C., the following mixture, all sieved through a 100-mesh screen:

|  | Grams |
| --- | --- |
| Apple pectin | 1.0 |
| Eggplant powder | 0.05 |
| Calcium acetate | 0.13 |
| Confectioner's sugar | 2.0 |

The purpose of the sugar was to prevent the pectin from forming lumps before going into solution.

The mixture was stirred in the tomato juice until dissolved, and the solution was then allowed to stand at about 50° C., until it had congealed to a solid gel. This occurred in about 55 minutes. The aspic was then placed in a refrigerator to cool for serving. The pH value of the finished gel was 4.05. It was easily removed from the container as a solid, with excellent texture and flavor. In a similar preparation, salt and lemon juice were added to enhance the flavor and a satisfactory solid gel was obtained.

*Example II.*—A pineapple salad was prepared by warming to 50° C., 100 cc. of pineapple, consisting of about 75 percent juice and 25 percent coarsely cut fruit, and dissolving in it a mixture of the same composition and proportions as used in Example I, except that the amount of eggplant powder was increased from 0.05 gm. to 0.08 gm. It congealed in 95 minutes to a satisfactory solid. The pH value of the gel was 4.0.

*Example III.*—A congealed vegetable salad was made by warming to 50° C., 100 cc. of canned cubed vegetables, containing equal volumes of liquor and of solids, and dissolving in it the same mixture as used in Example II. It congealed in 10 minutes. Its pH value was 4.75.

*Example IV.*—A pineapple jelly was made by warming 100 cc. of canned pineapple juice to 50° C., and dissolving in it 40 gm. of sugar and the same mixture as in Example I, except that 0.1 gm. sodium bicarbonate was included to increase the pH slightly. The sodium bicarbonate also generated gas within the lumps of the mixture, causing them to rise to the surface and to disperse. The jelly congealed in about 4 hours to a solid which was satisfactory as a spread. It is to be noted that this jelly contained only 40 percent of sugar, including the 15 per cent naturally contained in the juice, where as the formation of a standard jelly with the conventional pectin requires 65 percent of sugar.

*Example V.*—A chocolate milk pudding was made by dissolving in 100 cc. of milk the following mixture, then adding 7 gm. of grated chocolate:

|  | Grams |
| --- | --- |
| Apple pectin | 0.70 |
| Eggplant powder | 0.01 |
| Calcium acetate | 0.05 |
| Sodium bicarbonate | 0.1 |
| Sugar | 15.0 |

The pudding set to a gel in about 40 minutes. Since the temperature was never above 50° C., the chocolate remained largely in pieces. In another batch, the chocolate was melted in 20 cc. of the milk and then added to the balance of the mixture. This batch congealed in 55 minutes.

*Example VI.*—The following dry mixture was prepared:

|  | Grams |
| --- | --- |
| Apple pectin | 0.8 |
| Eggplant powder | .03 |
| Sugar | 14.0 |
| Cocoa | 6.0 |
| Powdered skim milk | 13.0 |

This was dissolved in 100 cc. of water and warmed to about 50° C. It solidified in 14 minutes to a consistency suitable for a chocolate pudding.

The proportions of the active ingredients may be varied over a wide range, to allow for such factors as the nature of the fluid to be congealed, the time within which congealing is desired, the viscosity or solidity desired, the quality of the pectin used, the activity of the pectase preparation, and so forth. For example, it will be noted above that, comparing milk with tomato juice, a lower concentration of pectin and a still lower concentration of calcium salt and of eggplant powder were sufficient for the milk. In fact, in Example VI, the calcium in the milk was sufficient without any added calcium. Again, in comparing the time of congealing of pineapple juice and vegetable juice, using the same proportions of active ingredients, the more acid fruit juice required four hours, and the much less acid vegetable juice only ten minutes, for setting to a gel. Increasing the proportion of pectase decreases the time of hardening, but increases the firmness of the gel. Decreasing the proportion of pectin decreases the firmness and increases the amount of bleeding of the gel.

Having thus described my invention, I claim:

1. An aqueous medium thickening and congealing agent comprising a dry, powdered mixture of pectin, pectase and a water-soluble salt of a polyvalent metal.

2. An aqueous medium thickening and congealing agent comprising a dry, powdered mixture of pectin, pectase and a water-soluble calcium salt.

3. An aqueous medium thickening and congealing agent comprising a dry, powdered mixture of pectin, pectase and a water-soluble magnesium salt.

4. The method of thickening or congealing aqueous mediums which comprises dissolving a dry, powdered mixture of pectin, pectase and a water-soluble salt of a polyvalent metal in said aqueous mediums under conditions favorable to enzyme action.

5. The method of thickening or congealing aqueous mediums which comprises dissolving a dry, powdered mixture of pectin, pectase and a water-soluble salt of a polyvalent metal in said aqueous mediums at a pH value within the range from 3.7 to 7.0 under conditions favorable to enzyme action.

6. The method of thickening or congealing aqueous mediums which comprises dissolving a dry, powdered mixture of pectin, pectase and a water-soluble salt of a polyvalent metal in said aqueous mediums under conditions favorable to enzyme action and maintaining the solution of a temperature approaching but not exceeding 50° C.

7. The method of thickening or congealing aqueous mediums which comprises dissolving a dry, powdered mixture of pectin, pectase and a water-soluble salt of a polyvalent metal in said aqueous mediums at a pH value within the range from 3.7 to 7.0 and maintaining the solution at a temperature approaching but not exceeding 50° C.

8. The method of thickening or congealing aqueous mediums which comprises dissolving a dry, powdered mixture of pectin, pectase and a water-soluble calcium salt in said aqueous mediums at a pH value within the range from 3.7 to 7.0 and maintaining the solution at a temperature approaching but not exceeding 50° C.

9. The method of thickening or congealing aqueous mediums which comprises dissolving a dry, powdered mixture of pectin, pectase and a water-soluble magnesium salt in said aqueous mediums at a pH value within the range from 3.7 to 7.0 and maintaining the solution at a temperature approaching but not exceeding 50° C.

10. The method which comprises dissolving a dry, powdered mixture of pectin, pectase and a water-soluble calcium salt in a vegetable juice at a pH value within the range from 3.7 to 7.0 and maintaining the solution at a temperature approaching but not exceeding 50° C. to form a gel of said juice.

11. The method which comprises dissolving a dry, powdered mixture of pectin, pectase and a water-soluble calcium salt in a fruit juice at a pH value within the range from 3.7 to 7.0 and maintaining the solution at a temperature approaching but not exceeding 50° C. to form a fruit jelly.

12. The method which comprises dissolving a dry, powdered mixture of pectin, pectase and a water-soluble calcium salt in milk at a pH value within the range from 3.7 to 7.0 and maintaining the solution at a temperature approaching but not exceeding 50° C. to form a gel of the milk.

JOHN J. WILLAMAN.